Nov. 29, 1932.  L. T. KAIPUST  1,889,286
HOE
Filed Oct. 12, 1931  2 Sheets-Sheet 2
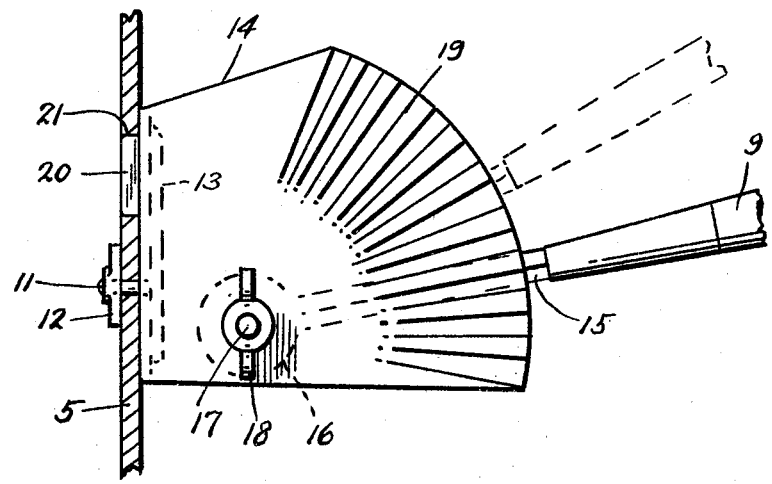
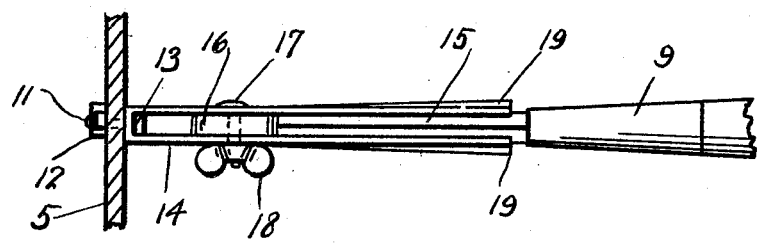
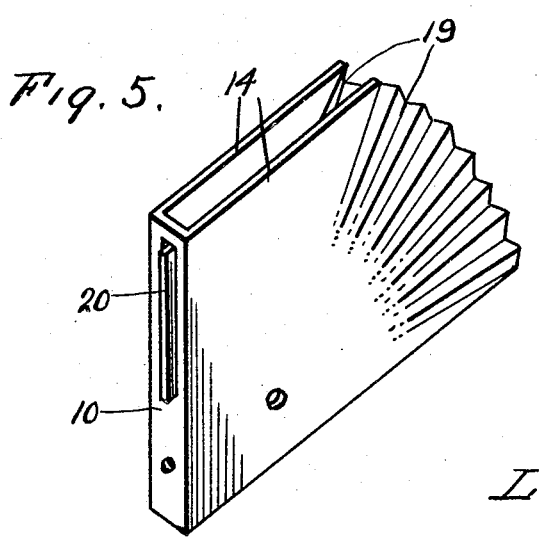
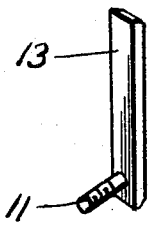
Inventor
L. T. Kaipust
By Clarence A. O'Brien
Attorney Patented Nov. 29, 1932

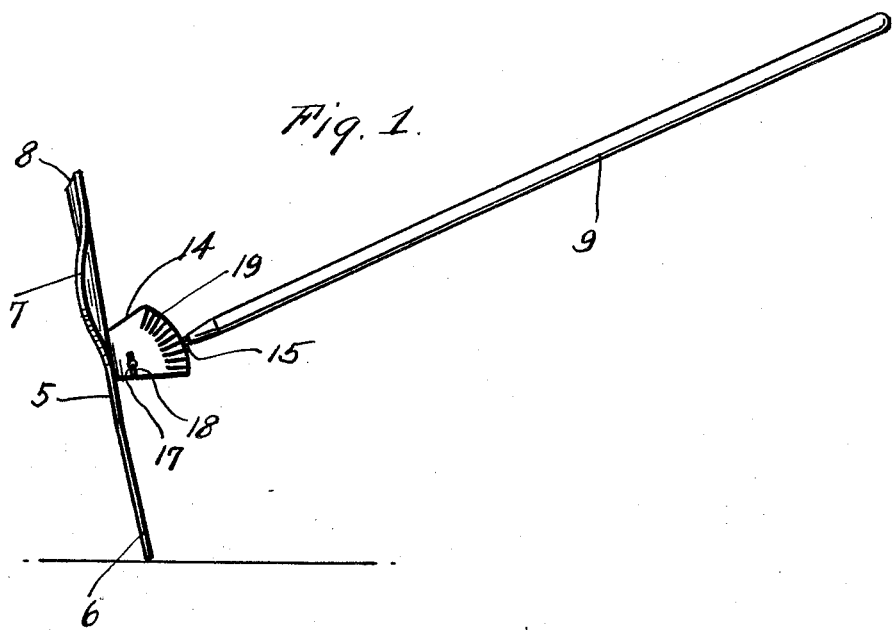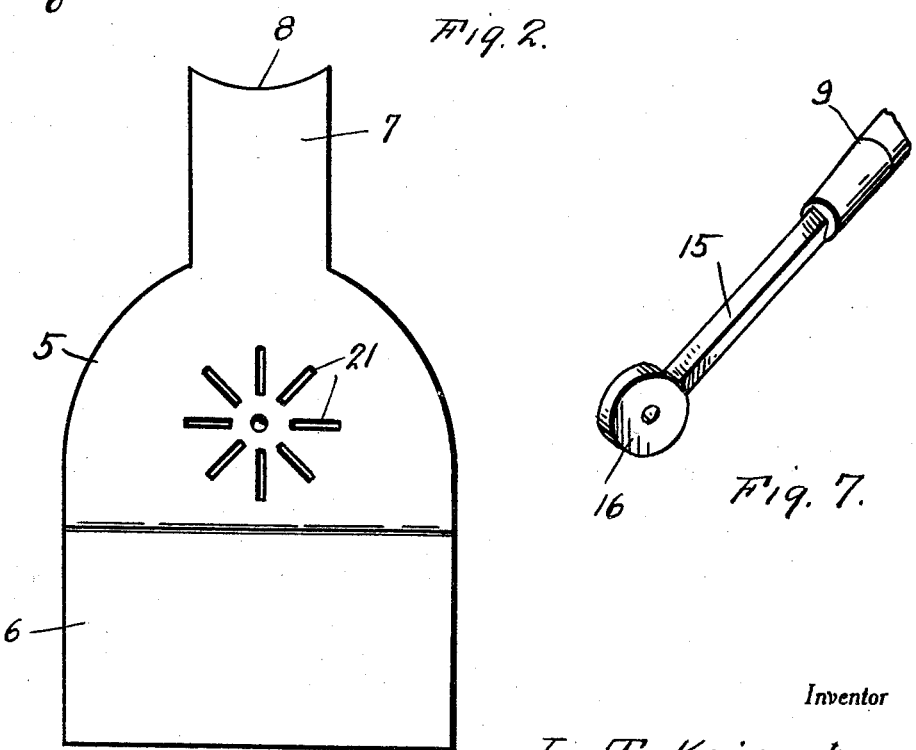

1,889,286

UNITED STATES PATENT OFFICE

LEO T. KAIPUST, OF PLATTE CENTER, NEBRASKA

HOE

Application filed October 12, 1931. Serial No. 568,483.

This invention relates to certain new and useful improvements in hoes, and has as its primary object the provision of a tool which may be used as a hoe, a weed cutter especially useful for cutting weeds adjacent to the sides or beneath the lowermost line wire of a fence, a cockleberry cutter, trench digger, dandelion weeder, scraper, turf edger, and many other purposes which will present themselves to those skilled in the art.

A still further object of the invention is to provide in a hoe a blade constructed so as to enable use of the hoe in any one of the numerous modes above suggested.

A still further object of the invention is to provide means for universally connecting a handle to the blade whereby the blade may be adjusted angularly either horizontally or vertically relative to the blade.

Other objects and advantages of the invention will become apparent from a study of the following description, taken in connection with the accompanying drawings wherein:

Figure 1 is a side elevational view of the hoe.

Figure 2 is an elevational view of the blade per se.

Figure 3 is a fragmentary sectional elevational view showing the means for connecting the handle to the blade.

Figure 4 is a bottom plan view of the structure shown in Figure 3.

Figure 5 is a perspective view of the U-shaped member forming part of the coupling means and Figure 6 is a perspective view of a plate and pivot bolt carried thereby.

Figure 7 is a perspective view of a portion of the handle.

With reference more in detail to the drawings, it will be seen that the blade comprises a tapered intermediate portion 5 at its largest end merging into a substantially square flat end portion 6 and at its smallest end merging into a relatively narrow rectangular extension 7 that at its free end is provided with a convexed edge 8, the member 7 being longitudinally twisted as suggested in Figure 1.

The handle for the blade is designated generally by the reference character 9, and the handle is universally adjustably connected to the blade through the medium of a substantially U-shaped member, the closed end 10 of which is provided adjacent its lower portion with an aperture accommodating a bolt 11 which extends through said aperture and through an aperture in the portion 5 of the blade to thereby pivotally connect the closed end of said U-shaped member with the blade, a wing nut or other fastening element 12 is engaged with the threaded free end of the bolt for securing the blade and U-shaped member in pivoted assembled relation. The bolt 11 is fixed at one end to the lower end portion of a plate 13 that engages the inner side of the end 10 of the U-shaped member between the opposed parallel portions 14 of said member.

The handle 9 at one end is provided with a non-circular shank 15 which at its free end is provided with an apertured disk 16 located between the portions 14 in the U-shaped member adjacent the closed end 10 thereof. A pivot bolt 17 extends through said portion 14 and through the disk 16 and has a wing nut or other suitable element 18 threadedly engaged therewith.

To secure the handle 9 at the desired adjustment, each of the members 14 at the open end of the U-shaped member is provided with an arcuate series of radial grooves 19 between a selected pair of opposed grooves, the non-circular shank 15 may be positioned.

To secure the U-shaped coupling member at the desired angular adjustment relative to the blade, the end 10 of said member is provided with a projection 20 adapted to be engaged with a selected one of a circular series of radial slots 21 provided intermediate portion 5 of the blade as shown in Figure 2.

In actual practice then it will be seen that the handle may be adjusted either vertically or horizontally and at any desired angle relative to the blade, and further, that the end 7 will be best suited when the device is used as a trencher or dandelion weeder, while the end 6 will be used to advantage when the device is used as a regular hoe, or as a scraper for side walks, floors or similar surfaces. When weeding adjacent to a fence, or directly beneath the lowermost line wire of the fence, the side edges of the end portion 6 of the blade may be used to advantage.

Even though I have herein shown and described the preferred embodiment of the invention, it is to be understood that the same is susceptible of further changes, modifications and improvements coming within the scope of the appended claims.

Having thus described my invention, what I claim as new is:

1. In a tool of the class described, a blade provided with a series of radial slots, a U-shaped member having its bight portion pivoted to the blade and provided with a lateral projection adapted to be engaged in a selected one of said slots, means for securing the member at the desired angular adjustment; a handle pivoted between the sides of said member, and inter-engaging means on said sides and said handle for retaining the handle at the desired adjustment.

2. In a tool of the class described, in combination, a blade having an annular series of radial slots, a substantially U-shaped member having its bight portion pivoted to said blade and provided with a lateral projection adapted to be engaged with a selected one of said slots, means for securing said U-shaped member in a desired adjusted position, the sides of said U-shaped member being provided with arcuate series of grooves, a shank non-circular in cross section pivoted between said sides and engageable within said grooves, and an adjustable securing element extending through the sides of said U-shaped member for urging the same toward each other and into engagement with said shank.

In testimony whereof I affix my signature.

LEO T. KAIPUST.